(12) United States Patent
Stabile et al.

(10) Patent No.: US 12,435,042 B2
(45) Date of Patent: Oct. 7, 2025

(54) PROCESS FOR THE PREPARATION OF KEY INTERMEDIATES FOR THE SYNTHESIS OF ELTROMBOPAG OR SALT THEREOF

(71) Applicant: F.I.S.—FABBRICA ITALIANA SINTETICI S.P.A., Montecchio Maggiore (IT)

(72) Inventors: Paolo Stabile, Montecchio Maggiore (IT); Floriana Semeraro, Montecchio Maggiore (IT)

(73) Assignee: F.I.S.—FABBRICA ITALIANA SINTETICI S.P.A., Montecchio Maggiore (IT)

( * ) Notice: Subject to any disclaimer, the term of this patent is extended or adjusted under 35 U.S.C. 154(b) by 883 days.

(21) Appl. No.: 17/619,383

(22) PCT Filed: Jul. 4, 2019

(86) PCT No.: PCT/EP2019/067968
§ 371 (c)(1),
(2) Date: Dec. 15, 2021

(87) PCT Pub. No.: WO2021/001044
PCT Pub. Date: Jan. 7, 2021

(65) Prior Publication Data
US 2022/0298116 A1    Sep. 22, 2022

(51) Int. Cl.
| | | |
|---|---|---|
| *C07D 231/46* | (2006.01) |
| *B01J 23/44* | (2006.01) |
| *C07C 65/105* | (2006.01) |
| *C07C 201/08* | (2006.01) |
| *C07C 227/04* | (2006.01) |

(52) U.S. Cl.
CPC ............ *C07D 231/46* (2013.01); *B01J 23/44* (2013.01); *C07C 65/105* (2013.01); *C07C 201/08* (2013.01); *C07C 227/04* (2013.01); *C07B 2200/13* (2013.01)

(58) Field of Classification Search
CPC .................................................. C07D 231/46
See application file for complete search history.

(56) References Cited

U.S. PATENT DOCUMENTS

| 7,160,870 B2 | 1/2007 | Duffy et al. |
| 7,414,040 B2 | 8/2008 | Heerding |

FOREIGN PATENT DOCUMENTS

| CN | 108101845 A | 6/2018 | |
| GB | 1414443 A * | 11/1975 | ............ C07C 76/02 |
| WO | 2001089457 A2 | 11/2001 | |
| WO | 2013049605 A1 | 4/2013 | |
| WO | 2015111085 A2 | 1/2015 | |
| WO | WO-2017037051 A1 * | 3/2017 | ......... A61K 31/4412 |

OTHER PUBLICATIONS

Suzuki "Ozone-mediated Nitration of Benzoic Acid, its Alkali and Alkaline-earth Metal Salts, Ester, Acid Chloride, Nitrile and Amide with Nitrogen Dioxide" Journal of the Chemical Society, Perkin Transactions 1: Organic and Bio-Organic Chemistry (1972-1999) 1994, (17), 2413-16.*
Suzuki "The Suzuki Reaction with Arylboron Compounds in Arene Chemistry" Modern Arene Chemistry. Edited by Didier Astruc 2002 Wiley-VCH Verlag Gmbh & Co. KGaA, Weinheim, pp. 53-106.*
J. Fischer, et al., "Investigation of the Relationship Between Lipid-Level Decreasing Effect and Structure in the Series of Glyoxylic Acid Phenylacetals, II", Acta Chimica Academiae Scientiarum Hungaricae, vol. 79, No. 4, pp. 419-432, 1973.
International Search Report and Written Opinion for Corresponding International Application No. PCT/EP2019/067968 (11 Pages) (Jan. 28, 2020).

* cited by examiner

*Primary Examiner* — David K O'Dell
(74) *Attorney, Agent, or Firm* — LUCAS & MERCANTI, LLP (57) ABSTRACT

Object of the present invention is an improved process for the preparation of key intermediates for the synthesis of Eltrombopag, passing through/using intermediate 5'-Chloro-2'-hydroxy[1,1'-biphenyl]-3-carboxylic acid alkaline metal salt of formula: wherein A is an alkaline metal.

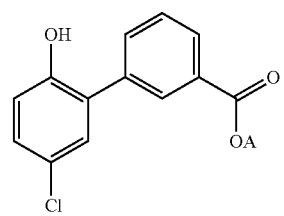

4 Claims, 3 Drawing Sheets

PROCESS FOR THE PREPARATION OF KEY INTERMEDIATES FOR THE SYNTHESIS OF ELTROMBOPAG OR SALT THEREOF

CROSS-REFERENCE TO RELATED APPLICATIONS

This application is a 371 of PCT/EP2019/067968, filed Jul. 4, 2019.

TECHNICAL FIELD

The present invention refers to a process for the preparation of key intermediate for the synthesis of Eltrombopag or any salt form, including an improved Palladium catalysed coupling reaction.

BACKGROUND ART

Eltrombopag (abbreviated with the acronym ETP) is a small molecule, non-peptide thrombopoietin (TPO) receptor agonist that stimulates the proliferation and differentiation of megakaryocytes.

ETP has the following chemical formula (I):

(I)

and has chemical name 3'-{(2Z)-2-[1-(3,4-dimethylphenyl)-3-methyl-5-oxo-1,5-dihydro-4H-pyrazol-4-ylidene]-hydrazino}-2'-hydroxy-3-biphenyl carboxylic acid or 3'-{N-[1-(3,4-dimethylphenyl)-3-methyl-5-oxo-1,5-dihydropyrazol-4-ylidene]hydrazino}-2'-hydroxybiphenyl-3-carboxylic acid.

This molecule is an active pharmaceutical ingredient, which is known in the market with the commercial name Promact® in the USA and Revolade® in most countries outside the USA.

Specifically, ETP is used to treat adults and children one year of age and older with low blood platelet counts due to chronic immune (idiopathic) thrombocytopenia (ITP), when other medicines to treat ITP or surgery to remove the spleen have not worked well enough.

Eltrombopag is commercialized in pharmaceutical compositions comprising this active pharmaceutical ingredient in form of Eltrombopag olamine or ETP olamine, i.e. a salt of ETP with ethanolamine in 1:2 ratio, also called Eltrombopag bisethanolamine salt of formula (VII):

(VII)

Eltrombopag olamine is supplied for oral administration in two strengths: 25 mg and 50 mg film-coated tablets.

Eltrombopag, certain synthetic intermediates thereof, and their syntheses are described in U.S. Pat. No. 7,160,870. In this patent, 3'-amino-2'-hydroxybiphenyl-3-carboxylic acid of formula (VI) (referred to as BPCA) is prepared according to the following Scheme 1:

Scheme 1

U.S. Pat. No. 7,414,040 discloses another scheme for the preparation of BPCA, providing no experimental data. This scheme is presented in the following Scheme 2.

The processes described in the literature involve several chemical steps and provide the product, BPCA, in a very low overall yield of about 7%.

Nevertheless, these routes of synthesis above appears to be too long to find ever an actual industrial application for the preparation of BPCA.

The application WO 2013/049605 also describes, in examples, a shorter route of synthesis of BPCA based on 3 steps, summarized in the following scheme:

In said shorter process summarized in scheme 3, the 2-bromo-4-chlorophenol is first coupled with the 3-carboxyphenylboronic acid to obtain compound 5'-chloro-2'-hydroxybiphenyl-3-carboxylic acid, then the obtained compound is nitrated in the 3' position to obtained 5'-chloro-2'-hydroxy-3'-nitrobiphenyl-3-carboxylic acid. This compound is then reduced to BCPA by means of triethylamine and hydrogen in presence of Palladium on charcoal.

However, the overall molar yield of the process to convert 2-bromo-4-chlorophenol into BCPA is quite low, being 91%×83%×86.7%=65.5% and the product has HPLC assay around 97% (A %).

Moreover, the synthesis requires the use of 2-bromo-4-chlorophenol which is a very smelly and lachrymatory reagent.

Thus, there is a need for a process for preparing the intermediate BPCA and the final product Eltrombopag and salts thereof in high yield and quality.

SUMMARY OF INVENTION

The problem addressed by the present invention is therefore that of providing a better process for preparing of Eltrombopag (ETP) or salt thereof and its intermediate BCPA, which allows to get round to the drawbacks above reported with reference to the known prior art.

This problem is solved by a process for the preparation of BCPA passing through/using intermediate 5'-Chloro-2'-hydroxy[1,1'-biphenyl]-3-carboxylic acid potassium salt, as outlined in the annexed claims, whose definitions are integral part of the present description.

Further features and advantages of the process according to the invention will result from the description hereafter reported of examples of realization of the invention.

DESCRIPTION OF EMBODIMENTS

Process for the preparation of Eltrombopag of formula (I) or salt thereof:

(I)

comprising of the following steps:

A) Palladium catalysed coupling of 3-carboxyphenylboronic acid of formula (II):

(II)

with 2-bromo-4-chlorophenol of formula (III) or an alkaline salt thereof:

(III)

to obtain the compound of formula (IV) or a hydrate thereof:

(IV)

wherein A is an alkaline metal;

B) nitration of the compound of formula (IV) prepared in the step A) to the compound of formula (V):

(V)

C) hydrogenation of compound of formula (V) obtained in the step B) to compound of formula (VI) or its hydrate form:

(VI)

D) conversion of compound of formula (VI) obtained in the step C) to Eltrombopag of formula (I) or salt thereof.

According to a preferred embodiment, the alkaline salt of the compound of formula (III) is selected in the group of lithium, sodium, potassium.

According to a preferred embodiment, the alkaline salt of the compound of formula (III) is considered to be a crystalline solid or a solution in a suitable solvent.

According to a preferred embodiment, the alkaline salt of the compound of formula (III) is a sodium salt, with the exception when the salt is in solution.

According to the preferred embodiment, the alkaline salt of the compound of formula (III) is potassium salt.

According to a preferred embodiment, the alkaline salt of the compound of formula (IV) is selected in the group of lithium, sodium, potassium.

According to the preferred embodiment, the alkaline salt of the compound of formula (IV) is potassium.

According to a preferred embodiment, the alkaline salt of the compound of formula (III) and the alkaline salt of the compound of formula (IV) are selected in the group of lithium, sodium, potassium.

According to the preferred embodiment, the alkaline salt of the compound of formula (III) and the alkaline salt of the compound of formula (IV) are potassium salt.

It has been indeed surprisingly found that said salts allow the preparation of the compound (I) with excellent yield, and/or with very high conversions.

Furthermore, it has been indeed surprisingly found that the said salts allow the preparation of the compound (I) with the almost complete conversion of the compound of formula (IV) to the compound of formula (V), and with robust reproducibility of the results.

Moreover, it has been indeed surprisingly found that the Potassium salt allows the preparation of the compound (I) with excellent yield, and/or with very high conversions.

According to a preferred embodiment, the Palladium catalysed coupling of step A) is preferably done in the presence of a suitable catalyst and a suitable base.

According to the invention, the Palladium catalysed coupling of step A) is carried out in presence of Palladium catalyst.

According to a preferred embodiment, the Palladium catalysed coupling of step A) is carried out in presence of Palladium catalyst selected from the group comprising: Palladium on charcoal, $Pd(OAc)_2$, tetrakis(triphenylphosphine)palladium(0), trans-benzyl(chloro)bis(triphenylphosphine)palladium(II), or other suitable catalysts.

According to the preferred embodiment, the Palladium catalysed coupling of step A) is carried out in presence of Palladium on charcoal.

According to a preferred embodiment, the Palladium catalysed coupling of step A) is preferably carried out in the presence of a suitable solvent.

According to the invention, the Palladium catalysed coupling of step A) is carried out in presence of suitable solvents including, for example, THF, dioxane, DMF, polyethylene glycol (PEG)-2000, PEG-400, acetone, toluene, 1,2-dimethoxyethane (also known as glyme), mixtures thereof and mixtures thereof with water.

According to the preferred embodiment, the Palladium catalysed coupling of step A) is carried out in 1,2-dimethoxyethane.

According to the preferred embodiment, the Palladium catalysed coupling of step A) is carried out in 1,2-dimethoxyethane aqueous mixture thereof.

According to a preferred embodiment, the Palladium catalysed coupling of step A) is carried out in presence of suitable bases including organic bases, like Hunig's base (diisopropylethyl amine), triethylamine and diazabicycloundecane (DBU); or inorganic bases, such as sodium hydroxide, potassium hydroxide, sodium carbonate, potassium carbonate, potassium phosphate or cesium carbonate.

According to some embodiments the base is triethylamine, sodium carbonate or potassium carbonate or cesium carbonate, preferably sodium carbonate or potassium carbonate.

According to the preferred embodiment, the Palladium catalysed coupling of step A) is carried out in presence of suitable base selected from the group comprising: sodium carbonate, potassium carbonate, potassium phosphate or cesium carbonate.

According to the preferred embodiment, the Palladium catalysed coupling of step A) is carried out in presence of potassium carbonate.

The molar yield of the step A) is typically from about 80% to about 95% (yield corrected for the content of water in the crystal). The product compound of formula (IV) has 95-100% chemical purity by HPLC A/A %.

The typical molar yield of the step A) is from about 85% to about 92%. The product compound (IV) has more than 99% chemical purity by HPLC A/A %.

The compound of formula (IV) is a crystalline solid.

It should be noted as said molar yield of 85-92% of the conversion of the compound of formula (III) to the compound of formula (IV) is remarkably high, compared to what reported in the closest prior art WO2013/049605 (see the repetition of the example of cited prior art, see example 9).

Moreover, the chemical purity of the compound of formula (IV) is remarkably high, compared to what reported in the closest prior art WO2013/049605 (see the repetition of the example of cited prior art, see example 9).

According to the invention, the nitration of step B) is preferably done by reacting the compound of formula (IV) with $NaNO_3$ or nitric acid, for example, in the presence of a suitable acid. Suitable acids for this reaction include, for example, acetic acid, sulfuric acid.

In particular, the compound of formula (V) of the step B) is produced starting from compound of formula (IV) according to the known prior art methods, such as, for instance, those disclosed in WO2013/049605, purposely in the examples 4 and 5 at pag. 16, which refers to scheme III at pag. 6.

The molar yield of the step B) is typically from about 80% to about 90%. The product compound of formula (V) has 95-99% chemical purity by HPLC A/A %.

According to a preferred embodiment, the hydrogenation of step C) is typically done with a suitable catalyst, such as Pd/C in the presence of a suitable base and a suitable solvent. Suitable bases include organic bases, like Hunig's base (diisopropylethyl amine), triethylamine, pyridine and diazabicycloundecane (DBU); or inorganic bases, such as sodium methoxide, potassium methoxide, sodium hydroxide, potassium hydroxide, sodium carbonate, sodium hydrogencarbonate, potassium carbonate or potassium hydrogencarbonate.

According to a more preferred embodiment the base is triethylamine, sodium hydroxide or potassium hydroxide, preferably trimethylamine or sodium hydroxide.

According to a preferred embodiment, the suitable solvents in the step C) include, for example, alcohol solvents, such as $C_1$-$C_4$ alcohols, for example ethanol, methanol, 2-propanol and butanol. According to some embodiments the solvent is methanol or ethanol.

In particular, the compound of formula (VI) of the step C) is produced starting from compound of formula (V) according to the known prior art methods, such as, for instance, those disclosed in WO2013/049605, purposely in the examples from 8 to 11 at pag. 17 and 18, which refers to scheme III at pag. 6.

The molar yield of the step C) is typically from about 70% to about 90%. The product compound of formula (VI) has 95-99% chemical purity by HPLC A/A %.

According to a further preferred embodiment of the present invention, the crystalline compound of formula (VI), obtained according to the above mentioned step C), is an hydrate form of the compound of formula (VI):

(VI)

in particular a dihydrate form, having the following characteristic peaks of X-ray powder diffraction pattern expressed in 2-Theta values (2θ) at: 5.8, 7.0, 9.4, 11.1, 13.7, 15.2, 16.5, 17.3, 18.8, 21.1 and 25.4, each peak ±0.2.

In the following step of the process, i.e. in the step D), the compound of formula (VI) produced in the step C) is converted into Eltrombopag formula (I). Said conversion can be carried out, for instance, according to the teaching of WO2013/049605, in particular the example 13 at pag. 19 which refers to scheme III at pag. 6.

In particular, in the step D), the compound of formula (VI) is coupled with the compound of formula (VIII):

(VIII)

in presence of NaNO$_2$, trimethylamine and sulfamic acid; to provide the Eltrombopag of formula (I).

The step of conversion of compound of formula (VI) produced in the step C) to Eltrombopag of formula (I) can be carried out, for instance, according to the teaching of WO2001/089457.

The starting material compound (VIII) is commercially available, for example from Sigma-Aldrich Inc. (USA) with product code AMBH2D6FE235 and product name 1-(3,4-Dimethylphenyl)-3-methyl-1H-pyrazol-5(4H)-one.

Moreover, the above mentioned starting material can be prepared, following the method disclosed in WO2001/089457, specifically, Example 1d describes its preparation.

The typically molar yield of the step D) is from about 60% to about 90%. The product Eltrombopag of formula (I) has 95-99% chemical purity by HPLC A/A %.

In another embodiment the present invention encompasses process for preparing 3'-amino-2'-hydroxybiphenyl-3-carboxylic acid (BPCA) of the formula (VI):

(VI)

comprising of the following steps:

A) Palladium catalysed coupling of 3-carboxyphenylboronic acid of formula (II):

(II)

with 2-bromo-4-chlorophenol of formula (III) or a alkaline salt thereof:

(III)

to obtain the compound of formula (IV) or a hydrate thereof:

(IV)

wherein A is an alkaline metal;

B) nitration of the compound of formula (IV) prepared in the step A) to obtain the compound of formula (V):

(V)

C) hydrogenation of compound of formula (V) obtained in the step B) to obtain compound of formula (VI) or its hydrate form.

The compound of formula (V) or salt thereof:

can be thus prepared by the following steps:

A) Palladium catalysed coupling of 3-carboxyphenylboronic acid of formula (II):

with 2-bromo-4-chlorophenol of formula (III) or an alkaline salt thereof:

to obtain the compound of formula (IV) or a hydrate thereof:

wherein A is an alkaline metal;

B) nitration of the compound of formula (IV) prepared in the step A) to obtain the compound of formula (V).

Another embodiment of the present invention encompasses process for preparing compound of formula (IV) or a hydrate thereof:

wherein A is an alkaline metal;

comprising of the step of Palladium catalysed coupling of 3-carboxyphenylboronic acid of formula (II):

with 2-bromo-4-chlorophenol of formula (III) or an alkaline salt thereof:

Moreover, the conditions discussed above to carry out the steps A), B), C) and D) also apply to said preparation of compounds of formula (IV, (V), (VI).

In particular, said Palladium catalysed coupling (of step A)) is carried out in presence of Palladium catalyst. More particularly, the Palladium catalysed coupling of step A) can be preferably carried out in presence of Palladium on charcoal.

In particular, said Palladium catalysed coupling (of step A)) is carried out in presence of suitable bases. More particularly, the Palladium catalysed coupling of step A) can be preferably carried out in presence of potassium carbonate.

In particular, said Palladium catalysed coupling (of step A)) is carried out in a suitable solvents. More particularly, the Palladium catalysed coupling of step A) can be preferably carried out in 1,2-dimethoxyethane aqueous mixture thereof.

More particularly, the Palladium catalysed coupling of step A) can be preferably carried out in presence of Palladium on charcoal and potassium carbonate; and 1,2-dimethoxyethane aqueous mixture thereof as a solvent.

The process of the present invention thus also provides new intermediates, i.e. the compound of formula (III-a):

(III-a)

wherein A is an alkaline metal.

According to a preferred embodiment, the alkaline salt of the compound of formula (III-a) is selected in the group of lithium, sodium, potassium.

According to a preferred embodiment, the alkaline salt of the compound of formula (III-a) is considered to be a crystalline solid or a solution in a suitable solvent.

According to the preferred embodiment, the alkaline salt of the compound of formula (III-a) is lithium salt of formula:

(III-b)

i.e: lithium 2-bromo-4-chlorophenolate.

According to the preferred embodiment, the alkaline salt of the compound of formula (III-a) is sodium salt of formula:

(III-c)

i.e: sodium 2-bromo-4-chlorophenolate.

According to the invention, the alkaline salt of the compound of formula (III-a) is a sodium salt, with the exception when the salt is in solution.

The compound of formula (III-c) is disclosed in the example from 1, 2 and 3 of the WO2013/049605, where the compound of formula (III-c) was generate in solution when 2-bromo-4-chlorophenol is theated with $Na_2CO_3$.

According to the preferred embodiment, the alkaline salt of the compound of formula (III-a) is potassium salt of formula:

(III-d)

i.e: potassium 2-bromo-4-chlorophenolate.

The process of the present invention thus also provides new intermediates, i.e. the compound of formula (IV) or an hydrate thereof:

(IV)

wherein A is an alkaline metal.

According to a preferred embodiment, the alkaline salt of the compound of formula (IV) is selected in the group of lithium, sodium, potassium.

According to a preferred embodiment, the alkaline salt of the compound of formula (IV) is considered to be a crystalline solid or a solution in a suitable solvent.

According to a preferred embodiment, the alkaline salt of the compound of formula (IV) or an hydrate thereof, is lithium salt of formula:

(IV-a)

i.e: 5'-Chloro-2'-hydroxy[1,1'-biphenyl]-3-carboxylic acid lithium salt.

According to a preferred embodiment, the alkaline salt of the compound of formula (IV) or an hydrate thereof, is sodium salt of formula:

(IV-b)

i.e: 5'-Chloro-2'-hydroxy[1,1'-biphenyl]-3-carboxylic acid sodium salt.

According to the preferred embodiment, the alkaline salt of the compound of formula (IV) or an hydrate thereof, is potassium salt of formula:

(IV-c)

i.e: 5'-Chloro-2'-hydroxy[1,1'-biphenyl]-3-carboxylic acid potassium salt.

Another object is the isolation as solid of the compound of formula (III-a):

(III-a)

wherein A is an alkaline metal selected in the group of lithium, sodium, potassium.

According to the preferred embodiment, the compound of formula (III-a) is in a crystalline form.

An other object is the isolation as solid of the compound of formula (IV) or an hydrate thereof:

(IV)

wherein A is an alkaline metal selected in the group of lithium, sodium, potassium.

According to the preferred embodiment, the compound of formula (IV) or an hydrate thereof is in a crystalline form.

It has been indeed surprisingly found that the crystalline form of compound of formula (IV) is stable and well suitable to be employed for preparing Eltrombopag of formula (I). Moreover, it has been surprising that the above mentioned crystalline form can be produced directly from the Palladium catalysed coupling reaction of the present invention.

Furthermore, it has been observed that said isolated solid of the compound of formula (IV) is a hydrate form.

The compound of formula (IV-c):

(IV-c)

in particular, its dihydrate form, has one of the following characteristic peaks of X-ray powder diffraction pattern expressed in 2-Theta values (2θ) at: 9.2, 11.1, 14.6 and 18.5, each peak±0.2.

According to a preferred embodiment of the present invention, the compound of formula (IV-c) has two or three of the following characteristic peaks of X-ray powder diffraction pattern expressed in 2-Theta values (2θ) at: 5.0, 9.2, 11.1, 14.6, 18.5, 25.6 and 37.1, each peak±0.2.

According to a further preferred embodiment of the present invention, the compound of formula (IV-c) has characteristic peaks of X-ray powder diffraction pattern expressed in 2-Theta values (2θ) at: 5.0, 9.2, 11.1, 14.6, 18.5, 19.9, 25.6, 27.7 and 37.1, each peak±0.2.

Figure 1:
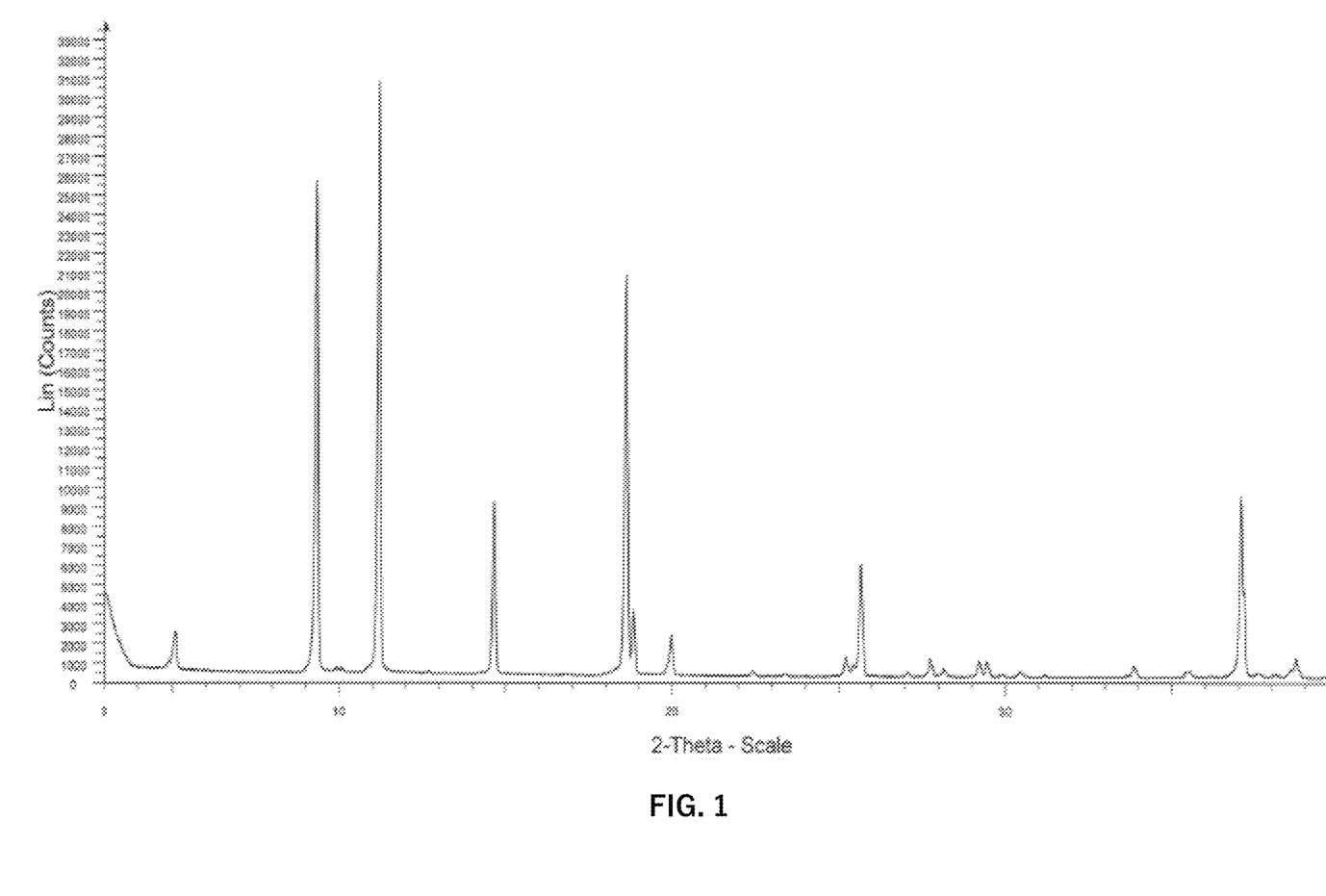
FIG. 1 shows the powder x-ray diffraction pattern of compound of formula (IV-c), obtained by the step A) of the process of the present invention.

Moreover, the list of the values of the peaks of X-powder diffraction ray pattern expressed in 2-Theta values (2θ) of the compound of formula (IV-c) is shown in example 15, and the X-powder diffraction ray pattern is shown in FIG. 1.

Furthermore, it has been observed that said compound of formula (IV-c) is a hydrate form, in particular a dihydrate form.

According to another preferred embodiment of the present invention, the compound of formula (IV-c) has DSC onset comprised in the range from 90° C. to 100° C. and/or from 117 to 120 and/or a DSC peak in the range from 91 to 92.5 and/or from 118.5° C. to 121° C.

Specifically, the value of the DSC onset and DSC peak is recorded as measured by DSC.

The DSC onset corresponds to the melting point recorded by DSC analysis, whose method is better described in the experimental part.

According to preferred embodiment of the present invention, the compound of formula (IV-c) has onset at about 90° C. as measured by DSC.

According to preferred embodiment of the present invention, the compound of formula (IV-c) has peak at about 92° C. as measured by DSC.

According to preferred embodiment of the present invention, the compound of formula (IV-c) has onset at about 118.5° C. as measured by DSC.

According to preferred embodiment of the present invention, the compound of formula (IV-c) has peak at about 120° C. as measured by DSC.

According to more preferred embodiment of the present invention, the compound of formula (IV-c) has onset at about 232° C. and peak at about 238° C. both as measured by DSC.

The compound of formula (III-a):

wherein A is an alkaline metal, with the exception of the sodium salt when the salt is in solution;
can be used for the preparations of the compound of formula (IV-d) or alkaline salt thereof:

or for the preparation of Eltrombopag formula (I):

According to a preferred embodiment, the compound of formula (III-a), wherein A is selected from lithium, sodium and potassium; can be used for the preparation of the compound of formula (IV-d) or alkaline salt thereof:

or for the preparation of Eltrombopag formula (I):

The compound of formula (IV):

wherein A is an alkaline metal;
can be used for the preparation of the compound of formula (V):

or for the preparation of Eltrombopag formula (I):

According to a preferred embodiment, the compound of formula (IV), wherein A is selected from lithium, sodium and potassium; can be used for the preparation of the compound of formula (V):

or for the preparation of Eltrombopag formula (I):

All the features and preferred embodiments of the process of the present invention given above can be combined in each possible combination to carry out the claimed process.

All of the intermediates and compounds of the present invention in particular those of formula (IV), (V), (VI) can be in isolated or in not isolated form, from the reaction mixture wherein they are prepared.

According to the preferred embodiment, all of the intermediates and compounds isolated are typically in form of a solid or of an isolated oil.

According to the preferred embodiment, all of the intermediates and compounds not isolated are typically in form of solution with an organic solvent or water.

The skilled in the art of organic chemistry can appreciate as the process of the invention allows an improvement of the productivity considering the reductions of number of steps employed to carry out the synthesis of Eltrombopag, and, at the same time, avoiding the use of expensive reagents.

In one embodiment of the present invention, Eltrombopag of formula (I) or salt thereof, prepared according to the above process, may be included in pharmaceutical compositions, comprising one or more pharmaceutically acceptable excipients or in combination with other active pharmaceutical ingredients and one or more pharmaceutically acceptable excipients.

EXPERIMENTAL SECTION

The starting material 2-bromo-4-chlorophenol (compound (III)), 3-carboxyboronic acid (compound (II)) and 1-(3,4-Dimethylphenyl)-3-methyl-1H-pyrazol-5(4H)-one (compound (VIII)), are reactants largely commercially available, for example, by Sigma-Aldrich.

The following table lists the abbreviations used:

| ACN | Acetonitrile |
|---|---|
| ° C. | Degree Centigrade or Degree Celsius |
| DSC | Differential scanning calorimetry |

-continued

| EtOAc | Ethyl acetate |
|---|---|
| eq. | Equivalent |
| G | Gram |
| h | Hour |
| HPLC | High performance liquid chromatography |
| IPA | Isopropyl alcohol |
| min | minute |
| mg | Milligram |
| mL | Milliliter |
| mmol | Millimole |
| MTBE | Methyl-tert-butyl ether or tert-butyl methyl ether |
| DCHA | Dicyclohexylamine |
| DCM | Dichloromethane |
| NMR | Nuclear magnetic resonance |
| rpm | Revolutions per minute |
| RT | Room temperature |
| T | Temperature |
| THF | Tetrahydrofuran |
| V | Volume |
| w/w | Weight/weight |
| XRPD | X-ray Powder Diffraction |
| TGA | Thermogravimetric analysis |
| μL | Microliter |

The term "volume" means volume of solvent per unit of product, thus, for example, 1 volume is 1 Liter per 1 Kilo, or 1 mL per 1 gram, or 1 microliter per 1 milligram. Thus, 10 volumes means for example 10 liters per 1 Kilogram of substance.

Suspension means a solid material suspended in a solvent or solution, i.e. mixture of a solid with a solvent, which is liquid. The solvent also contains other compound or a solid.

Room temperature (RT) means a temperature that is comprised in a range of value from 20° C. to 25° C., it is defined as comfortable temperature range indoors.

Molar equivalent means that the molar amount of a substance reacts with a molar amount of another substance in a given chemical reaction.

Example 1: Preparation of Compound of Formula (III-d)

A mixture of 4-chlorophenol (100 g, 78 mmol) in DCM (500 mL, 5V), was cooled at 0-5° C. Then a solution of $Br_2$ (124.4 g, 78 mmol, 1 eq) in 200 mL of DCM was slowly added in 2-3 h, maintaining the temperature at 0-5° C. The resulting mixture was stirred at 0-5° C. for 8 h, then a solution of 20% $NaHSO_3$ in water (100 mL) was added. The obtained mixture was stirred for 5 min-, then the organic layers were separated. The organic layer was washed with 100 mL of water, stirred for 5 min, then the phase were separated. The organic phase was concentrated under vacuum at 40° C., then the obtained oily (125 g) residue was diluted with toluene (480 mL) and stirred for 30 min. To the obtained solution was added portionwise DCHA (147 g, 1.05 eq). The mixture was heated to 85° C., until a complete solution was obtained. The obtained solution was cooled to room temperature in at least 4 h, then cooled down to 0~10° C. The resulting suspension was filtered and the cake was washed with pre-cooled toluene (80 mL×2), to provide the DCHA salt (223 g) as white solid (yield 73.9%).

A mixture of DCHA salt in MTBE was stirred for 30 min at 15-25° C., then the pH was adjusted to 2-3 by the addition of a solution of 10% $H_2SO_4$ in water (350 mL). The obtained mixture was stirred for 5 min, then the organic layers were separated. The organic layer was washed 3 times with 223 mL of water, stirred for 5 min, then the phases were separated. The organic phase was concentrated under vacuum at 40° C., then the obtained oily (127 g) residue was diluted with toluene (635 mL) and stirred at 20-25° C. for 30 min. Then, to the obtained solution was added KOH (54 g, 1.0 eq), the mixture was stirred at room temperature for 8 h. The obtained suspension was filtered and the cake was washed with toluene (127 mL); then the solid was dried at 50-55° C. for 8 h under vacuum. The title product, 146 g (overall molar yield of 65%), was obtained as a white crystal, having chemical purity of 99.84% A/A % by HPLC, and the assay of 90.8% by HPLC. Experimental MS(ES) m/z [M-H]−: 206.99 Da.

1H NMR (400 MHz, DMSO) δ 7.06 (d, J=2.9 Hz, 1H), 6.69 (dd, J=8.8, 2.9 Hz, 1H), 6.17 (d, J=8.8 Hz, 1H).

Example 2: Preparation of Potassium 5'-chloro-2'-hydroxybiphenyl-3-carboxylate, i.e. Compound of Formula (IV-c)

To a mixture of Potassium 2-Bromo-4-chlorophenoxide compound of formula (III-d) (20 g, 0.08 mol), obtained according to the example 1, water (17 mL) and 1,2-dimethoxyethane (170 mL) was added a solution of water (9.8 mL) and potassium carbonate (2.2 g) at 18-20° C. under nitrogen atmosphere. The solution obtained was stirred for 35 min at 18-20° C. under nitrogen atmosphere and 5% Pd/C 50% wet (8.7 g, 2.0 mmol) was added. The resulting mixture was degassed. To the mixture was added a solution of 3-carboxyphenylboronic acid (16.9 g, 0.10 mol), water (143.2 mL) and potassium carbonate (9.1 g) in 40 min at 20-24° C. The resulting mixture was degassed. The suspension was stirred for about 2 h at 20-22° C., then heated and stirred at 40-42° C. overnight. The reaction mixture was cooled to 22° C. and Dicalite (4 g, 0.2 w/w) was added. After stirring, the suspension was filtered and the solid washed twice with a mixture of 1,2-dimethoxyethane (17 mL), water (33 mL) and potassium carbonate (0.8 g). The filtrate was concentrated and to the suspension was added water (30 mL). The mixture was cooled to 20-21° C. and stirred for about 2.5 h. The solid was filtered, washed with water (17 mL×2) and MTBE (17 mL). The obtained solid was dried at 45° C. under vacuum to provide the desired product as a withe solid (22.7 g, yield 86.4% corrected for the KF, HPLC purity 99.9%, KF 11.06%). Experimental MS(ES) m/z [M-H]−: 247.20 Da.

1H NMR (400 MHz, DMSO) δ 8.12 (s, 1H), 7.86-7.75 (m, 1H), 7.55-7.44 (m, 1H), 7.30 (t, J=7.6 Hz, 1H), 7.19 (d, J=1.2 Hz, 1H), 7.13 (s, 2H).

Example 3: Preparation of 5'-chloro-2'-hydroxy-3'-nitrobiphenyl-3-carboxylic acid, i.e. Compound of Formula (V)

Potassium 5'-chloro-2'-hydroxybiphenyl-3-carboxylate compound of formula (IV-c), obtained according to the example 2, (10 g, 0.031 mol, KF 11%) was suspended in acetic acid (200 mL). The suspension was stirred for about 1 h and then 65% nitric acid (6.8 g, 0.07 mol) was added dropwise in 15 min. The resulting reaction mixture was stirred for 3 h at 20° C. To the yellow suspension was added water (100 mL) and the reaction mixture was stirred for 3 h at 20° C. The precipitate was collected by filtration, washed with water (5×50 mL) and then dried at 45° C. under vacuum to provide the desired yellow solid (8.6 g, yield 94.4%, HPLC purity 98.7%).

Example 4: Preparation of 3'-amino-2-hydroxybiphenyl-3-carboxylic acid, i.e. Compound of Formula (VI)

5'-Chloro-2'-hydroxy-3'-nitrobiphenyl-3-carboxylic acid compound of formula (V), obtained according to the example 3, (100 g, 0.34 mol) was suspended in methanol (1200 mL) and thiethylamine (120.6 g, 1.19 mol) was added in 20 min at 18-22° C. to obtain a red-brown solution. 5% Pd/C 50% wet (7.2 g, 1.7 mmol) was added to the solution and the mixture was hydrogenated for about 50 h at room temperature and 4 bar pressure. The catalyst was then removed by filtration and the cake was washed with methanol (200 mL×2). The filtrate was concentrated and a red mixture was obtained. To the mixture was added water (500 mL) and the suspension was concentrated again. The pH of the suspension was adjusted to 5.5 by dropwise addition of a solution of HCl 32% (30 mL) and water (570 mL) and the resulting suspension was stirred. The suspension was filtered, and the solid was washed with water (2×100 mL) and dried at 45° C. under vacuum to provide the desired product (73.7 g, yield 94.4%; HPLC purity 96.7%).

Example 5: Preparation of Crude Eltrombopag Olamine, i.e. Compound of Formula (I)

3'-Amino-2'-hydroxybiphenyl-3-carboxylic acid (25 g, 0.108 mol, KF 0.6%), compound of formula (VI) obtained according to the example 4, was suspended in methanol (250 mL) and stirred for about 30 min at room temperature. A solution of HCl 32% (31.1 g, 0.27 mol) in water (47.5 mL) was added in about 30 min. The resulting dark solution was stirred for 15 min and then cooled to 3° C. A solution of sodium nitrite (7.5 g, 0.11 mol) in water (25 mL) was added in about 30 min at 2-3° C. Sulfamic acid (1 g, 0.04 w/w) in water (25 mL) was added at 1-2° C. and the resulting mixture was stirred for 1.75 h at 2-4° C. The suspension was heated to 20° C. and ethanolamine (19 g) was added to adjust to pH 7-8. A solution of (3,4-Dimethylphenyl)-3-methyl-5-pyrazolone, compound of formula (VII), (22.1 g, 0.11 mol) in methanol (250 mL) was added in about 30 min at 19-20° C. to the suspension and the resulting mixture was stirred for 4.5 h at 20-22° C. Ethanolamine (14 g) was added to the suspension in 15 min at 22-23° C. and the red-brown suspension obtained was stirred for about 2.5 h at room temperature. The solid precipitated and was collected by filtration, washed with a mixture of methanol and water (1:1, 50 mL×2) and methanol (25 mL×2). The solid was dried at 40° C. under vacuum for about 12 h giving red-brown crystals of crude Eltrombopag Olamine (50.8 g, yield 82.5%, HPLC purity 98.5%).

Example 6: Purification of Eltrombopag Olamine

Eltrombopag Olamine (48 g, 0.08 mol) obtained according to the example 5, was suspended in ethanolamine (420 mL) and heated to 40° C. To the reaction mixture was added ethanol (1116 mL) dropwise in about 1 h at 39-41° C. The resulting mixture was cooled to 5° C. and stirred for about 2.5 h. The solid was filtered, washed with ethanol (140 mL×2) and dried at 55° C. under vacuum for about 16 h to provide a red brown solid (41.9 g, yield 87.3%, HPLC purity 99.8%).

Example 7: Preparation of Potassium 5'-chloro-2'-hydroxybiphenyl-3-carboxylate, i.e. Compound of Formula (IV-c)

-continued

A mixture of Pd(OAc)₂ (183.2 mg), potassium salt of 2-bromo-4chlorophenol (40 g) and 1,2-dimethoxyethane (400 mL) and a solution of K₂CO₃ (4.5 g) in water (80 mL) were combined and heated to 50° C. under nitrogen atmosphere. A solution of 3-carboxyboronic acid (28 g) and K₂CO₃ (17.9 g) in water (320 mL) was added at 50° C. in 30 min. The resulting mixture was stirred for 4 h at 50° C. Dicalite (4 g) was added and the mixture was stirred for 30 min at 50° C. The suspension was filtered and washed with a solution of K₂CO₃ (4 g) in water (80 mL). The filtrates were combined and half of the solution was concentrated to a residual volume of 190 ml by distillation under reduced pressure at 45-55° C. The resulting suspension was cooled to room temperature (20-25° C.), stirred for 1 h and filtered. The white solid was dried under vacuum at 45° C. to afford 18.4 g (91.1% yield, uncorrected for the water content).

Example 8: Preparation of Potassium 5'-chloro-2'-hydroxybiphenyl-3-carboxylate, i.e. Compound of Formula (IV-c)

To 2-Bromo-4-chlorophenol (200 g, 0.96 mol) was added a solution of water (200 mL) and potassium hydroxide (63.6 g, 1.12 mol). To the solution was added 1,2-dimethoxyethane (2 L). After degassing, it was added a solution of potassium carbonate (26.6 g) and water (120 mL) under nitrogen atmosphere. The obtained solution was stirred for 15 min under nitrogen atmosphere and 5% Pd/C 50% wet (102.6 g, 0.024 mol) was added. To the mixture was added a solution of 3-carboxyphenylboronic acid (200 g, 1.2 mol), water (1.68 L) and potassium carbonate (106.6 g) in 1 hat 20° C. The suspension was stirred for 2 h at 18° C., then heated to 40° C. in 1 hour and stirred at overnight. The reaction mixture was cooled to room temperature and Dicalite (40 g, 0.2 w/w) was added. The suspension was filtered and the solid washed twice with water (400 mL). The filtrate was concentrated and to the suspension was added water (400 mL). The mixture was cooled to room temperature and stirred for 2 h. The solid was filtered, washed with water (200 mL×2) and MTBE (200 mL). The obtained solid was dried at 45° C. under vacuum to provide the desired product (284.2 g, yield 90.7% corrected for the water content, HPLC purity 99.6%, KF 11.8%).

Example 9: Preparation of 5'-chloro-2'-hydroxybiphenyl-3-carboxylate, i.e. Compound of Formula (IV-d), According to WO2013/049605

To a mixture of Sodium carbonate (8.48 g, 80 mmol), PEG 2000 (140 g) and water (120 mL) was added Palladium acetate (448 mg, 5 mol %) and the resulting suspension was heated to 50° C. under inert atmosphere. 2-Bromo-4-chloro phenol (8.3 g, 40 mmol) and 3-carboxyphenyl boronic acid (9.96 g, 60 mmol) were added to the reaction mixture, the suspension was heated to 50° C. and stirred for 19 h. The mixture was cooled to room temperature, diluted with water (300 mL) and a solution of HCl 5% aq (50 mL) was added to adjust to pH=2. The aqueous layer was extracted with ethyl acetate (160 mL) and the biphasic solution was filtered.

The aqueous layer was extracted with ethyl acetate (160 mL×2). The combined organic phases were washed with water (100 mL) and brine (100 mL). The organic layer was dried over anhydrous MgSO4 and concentrated under vacuum to provide an off white solid (9.3 g, KF 1.26%, yield 92% corrected for KF, HPLC Purity 92.88%).

Example 10: Preparation of Compound of Formula (III-d)

To a suspension of 2-bromo-4-chlorophenol (50 g) and water (125 mL) was added potassium hydroxide (27 g) and the solution was stirred for 30 min at 20-25° C. The aqueous solution was extracted with 2-methyltetrahydrofurane (250 ml), the layers were separated and the organic phase was concentrated to a residual volume of 100 mL by distillation under reduced pressure at 30-33° C. Toluene (3×150 mL) was charged and the resulting mixture concentrated to a residual volume of 100 mL by distillation under reduced pressure to afford an orange oil. The oil was added with toluene (250 mL) and the mixture was stirred and filtered and the cake washed with toluene (50 mL). The wet solid was dried under reduced pressure to afford 58 g of an off-white solid (98% yield). Experimental MS(ES) m/z [M-H]$^-$: 206.99 Da.

1H NMR (400 MHz, DMSO) δ 7.06 (d, J=2.9 Hz, 1H), 6.69 (dd, J=8.8, 2.9 Hz, 1H), 6.17 (d, J=8.8 Hz, 1H).

Example 11: Preparation of Compound of Formula (III-b)

Following the procedure of example 1 or 10, except for substituting KOH with LiOH, the title compound was prepared as white crystals.

1H NMR (400 MHz, DMSO) δ 7.09 (d, J=2.9 Hz, 1H), 6.73 (dd, J=8.8, 2.9 Hz, 1H), 6.27 (d, J=8.8 Hz, 1H).

Example 12: Preparation of Compound of Formula (III-c)

Following the procedure of example 1 or 10, except for substituting KOH with NaOH, the title compound was prepared as white crystals.

1H NMR (400 MHz, DMSO) 7.05 (d, J=2.9 Hz, 1H), 6.68 (dd, J=8.8, 2.9 Hz, 1H), 6.12 (d, J=8.8 Hz, 1H).

Example 13: Preparation of Compound of Formula (IV-a)

Following the procedure of example 2, except for substituting the compound of formula (III-d) with compound of formula (III-b), and substituting potassium carbonate with lithium carbonate, the title compound was prepared as white crystals.

1H NMR (400 MHz, DMSO) δ 8.13 (t, J=1.5 Hz, 1H), 7.91 (dd, J=7.8, 1.2 Hz, 1H), 7.79-7.75 (m, 1H), 7.53 (t, J=7.7 Hz, 1H), 7.31 (d, J=2.7 Hz, 1H), 7.24 (dd, J=8.6, 2.7 Hz, 1H), 7.00 (d, J=8.6 Hz, 1H).

Example 14: Preparation of Compound of Formula (IV-b)

Following the procedure of example 2, except for substituting the compound of formula (III-d) with compound of formula (III-c), and substituting potassium carbonate with sodium carbonate, the title compound was prepared as white crystals.

1H NMR (400 MHz, DMSO) δ 8.10 (t, J=1.5 Hz, 1H), 7.90-7.85 (m, 1H), 7.66-7.61 (m, 1H), 7.43 (t, 7.7 Hz, 1H), 7.26 (d, J=2.7 Hz, 1H), 7.20 (dd, J=8.6, 2.7 Hz, 1H), 7.04 (d, J=8.6 Hz, 1H).

Example 15: XRPD Diffractometer and Method for the Characterization of the Following Products of the Present Invention As far as the XRPD method is concerned, the instrument, the instrumental parameters and the other parameters used are reported in table below:

| Instrument | X-ray diffractometer D8 ADVANCE (Bruker) Instrumental parameters |
|---|---|
| Scan | 1. From 3.00° to 40.00° |
| Source | Cu; 35 mA, 50 KV |
| Radiations | K(α1) e K(α2) |
| primary optic settings | 1. 20 mm programmable slit |
|  | 2. 2.3° Soller |
|  | 3. Distance sample-detector 217 mm |
| secondary optic settings | 1. Nickel filter, 0.5 mm thickness |
|  | 2. 1.5° Soller |
|  | 3. 3 mm slit |
|  | 4. Distance sample-detector 217 mm |
| Detector | PSD detector (model Lynx eye, Bruker) |
| Operative conditions of detector | Scan from 3.0° to 40.0°, step size 0.015°, collection time 0.5 sec per step and PSD window 0.8° |
|  | Other parameters |
| Sample holder | 1. round in polycarbonate with dome, rotating |
|  | 2. dimensions: diameter 25 mm and depth 1 mm |

The XRPD diffractogram of compound of formula (IV-c) obtained in the previous examples (i.e. as in example 2), was analyzed and the XRPD diffractogram, as disclosed in the description part of the invention, and showed in FIG. 1.

A list of selected peaks of XRPD of compound of (IV-c) obtained according to the example 2 is reported below (only peaks with relative intensity greater than or equal to 3% are indicated):

| Angle (2-θ° ± 0.1) | Intensity (%) |
|---|---|
| 5.039° | 8.4 |
| 9.294° | 83.5 |
| 11.171° | 100.0 |
| 14.646° | 29.9 |
| 18.599° | 67.8 |
| 18.854° | 11.8 |
| 19.968° | 7.8 |
| 25.237° | 4.1 |
| 25.673° | 19.4 |
| 27.765° | 3.8 |
| 37.115° | 30.8 |
| 38.764° | 3.8 |

Example 16: DSC and Method for the Characterization of the Following Products of the Present Invention DSC analysis was recorded with a Mettler DSC822e. A sample of compound was charged into a 40 μaluminium crucible with a pinhole lid and was heated, under nitrogen (50 mL/min), at 10° C./min from 30 to 280° C.

DSC testing was performed in a sealed medium pressure stainless steel crucible. All the testing was performed by heating the sample from 30° C. at a rate of 10° C./minute up to a maximum temperature of 280° C.

DSC analysis of the crystalline compound of formula (IV-c) obtained in the previous examples (i.e. as in example 2), was analysed.

Figure 2:
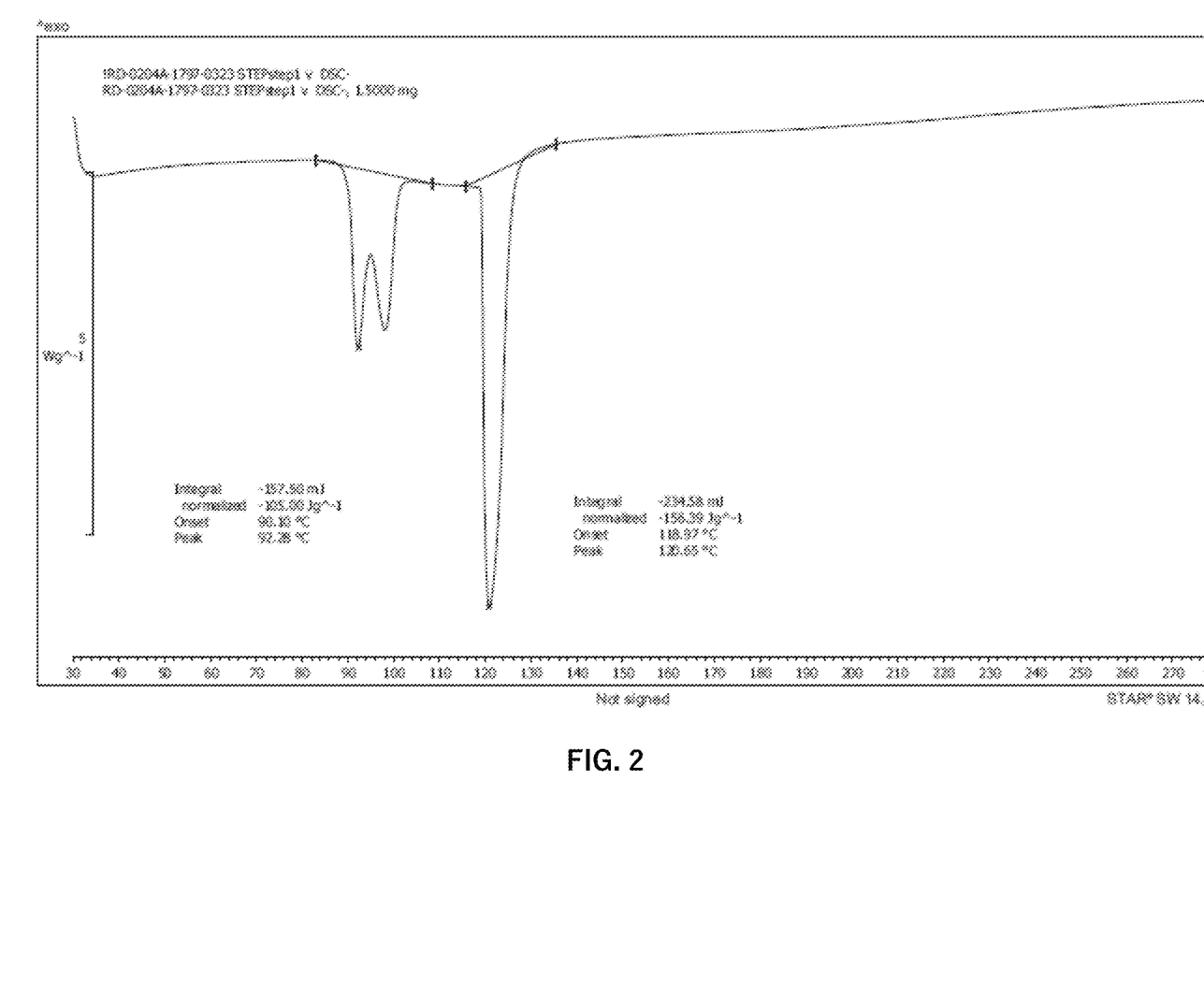
FIG. 2 shows the DSC curve of compound of formula (IV-c), obtained by the step A) of the process of the present invention.
Figure 3:
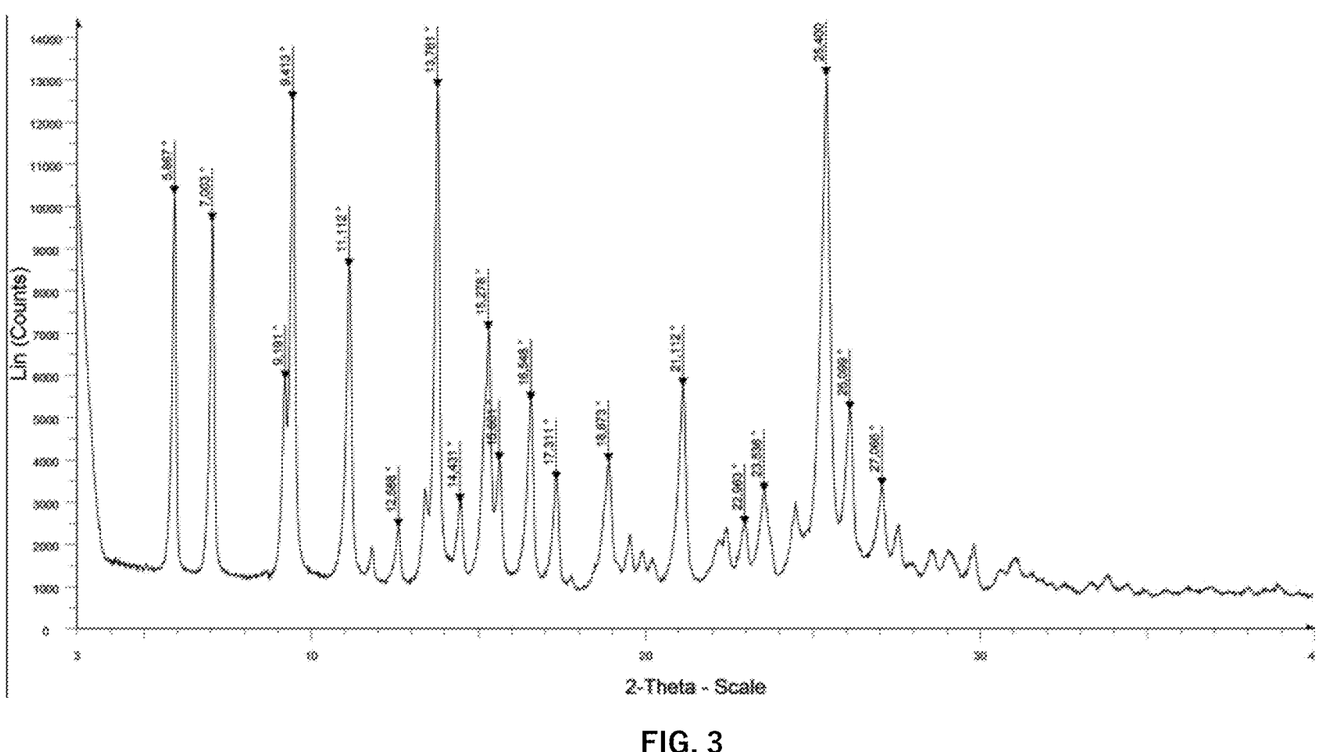
FIG. 3 shows the powder x-ray diffraction pattern of compound of formula (VI), obtained by the step C) of the process of the present invention.

Said DSC analysis shows one endothermic event with an onset at 90.10° C. that corresponds to the dehydration of compound of formula (IV-c) and a peak at 92.28° C., followed by a sharp exothermic event with an onset at 118.97° C. that corresponds to a melting event and a peak at 120.65° C. (as shown in FIG. 2).

Example 17: Karl Fischer and Method for the Characterization of the Following Products of the Present Invention Karl Fischer analyses were recorded with a Metrohm 787 KF Trinito. The product was dissolved in MeOH. Two samples were analyzed using the following reactants: Hydranal-Composite 5 (Riedel de Haën Ref. 34805), Hydranal Methanol Rapid (Riedel de Haën Ref. 37817) and Hydranal Water Standard 1.0 (Riedel de Haën Ref. 34828 used to calculate the factor).

The water content of compound of formula (IV-c) prepared in example 2 is 11.06%, typically the KF of the compound of formula (IV-c) is between 11% to 11.8%.

Example 18: TGA and Method for the Characterization of the Following Products of the Present Invention Thermogravimetric analysis was recorded in a thermogravimetric analyzer Mettler TGA/SDTA851e. A sample of about 4 mg was weighed into a 70 μL alumina crucible with a pinhole lid and was heated at 10° C./min from 30 to 400° C., under nitrogen (50 mL/min).

The TG analysis of compound of formula (VI) prepared in example 4 shows a 0.6% weight loss before the melting point (between 70° C. and 230° C.). This loss of weight could come from the elimination of water. Typically the TG analysis of compound of formula (VI) is between 0.59% to 0.79%.

Example 19: Analytical Method for Determining the Chemical Purity and the Amount of Impurities of the Present Invention. The method Monitoring the Reaction of Examples 2, and from 7 to 9 and the Purity of the Compound of Formula (III-a) and Formula (IV), via HPLC Colum: Acquity CSH Phenyl-Hexyl 100×2.1 mm, 1.7 μm (or equivalent);
Temp. Column: 40° C.;
Mobile Phase A: H₂O:MeOH (80:20)+0.1% TFA;
Mobile Phase B: ACN:MeOH (80:20)+0.1% TFA
Gradient

| Time (min) | % A | % B |
|---|---|---|
| 0 | 100 | 0 |
| 1 | 100 | 0 |
| 10 | 5 | 95 |
| 12 | 5 | 95 |
| 12.1 | 100 | 0 |
| 15 | 100 | 0 |

Flow: 0.7 mL/min;
UV Detector: 220 nm;
Injection Volume: 2 μL;
Analysis Time: 10 min;
Diluent: H₂O:ACN (50:50).

The invention claimed is:
1. A process for the preparation of Eltrombopag of formula (I) or salt thereof:

comprising of the following steps:
A) Palladium catalyzed coupling of 3-carboxyphenylboronic acid of formula (II):

with the potassium salt of 2-bromo-4-chlorophenol of formula (III):

to obtain the compound of formula (IV) or a hydrate thereof:

wherein A is potassium;

B) nitration of the compound of formula (IV) prepared in the step A) in presence of acetic acid and 65% nitric acid to the compound of formula (V):

C) hydrogenation of compound of formula (V) obtained in the step B) to compound of formula (VI) or its hydrate form:

D) conversion of compound of formula (VI) obtained in the step C) to Eltrombopag of formula (I) or salt thereof.

2. The process according to claim 1, wherein the Palladium catalyzed coupling of step A) is carried out in presence of Palladium on charcoal.

3. The process according to claim 1, wherein the Palladium catalyzed coupling of step A) is carried out in 1,2-dimethoxyethane or an aqueous mixture thereof.

4. The process according to claim 1, wherein the Palladium catalyzed coupling of step A) is carried out in presence of potassium carbonate.

* * * * *